United States Patent

[11] 3,633,432

| [72] | Inventor | Edgar T. Horsey<br>Chagrin Falls, Ohio |
|---|---|---|
| [21] | Appl. No. | 888,344 |
| [22] | Filed | Dec. 29, 1969 |
| [45] | Patented | Jan. 11, 1972 |
| [73] | Assignee | E. T. Horsey & Company Incorporated<br>Chagrin Falls, Ohio |

[54] PULLEY CONSTRUCTIONS
7 Claims, 11 Drawing Figs.

[52] U.S. Cl. .................................................. 74/230.11,
29/159.3
[51] Int. Cl. .................................................. F16h 55/46
[50] Field of Search .................................. 74/230.3,
230.11, 230.7; 29/159.3

[56] References Cited
UNITED STATES PATENTS

| 2,253,612 | 8/1941 | Dow | 74/230.3 |
|---|---|---|---|
| 2,722,130 | 11/1955 | Caldwell | 74/230.7 |
| 2,922,310 | 1/1960 | Anderson | 74/230.3 |
| 2,013,440 | 12/1961 | White | 74/230.3 |
| 3,076,352 | 2/1963 | Larsh | 74/230.7 |
| 3,096,660 | 7/1963 | Spirakus | 74/230.3 |
| 3,206,992 | 9/1965 | Ferdig | 74/230.3 |
| 3,367,199 | 2/1968 | Dankowski | 74/230.3 |

*Primary Examiner*—C. J. Husar
*Attorney*—Meyer, Tilberry and Body

ABSTRACT: The drawings disclose several V-belt-type pulleys which are composite plastic, and plastic and metal. The pulleys are arranged so that all elements can be simple injection molded plastic parts or metal stampings. None of the pulleys require any machining steps in their manufacture.

PATENTED JAN 11 1972

INVENTOR.
EDGAR T. HORSEY
BY
Meyer, Tilberry & Body
ATTORNEYS.

PULLEY CONSTRUCTIONS

The present invention is directed toward the pulley art and, more particularly, to an improved pulley and method.

The invention is especially suited for manufacturing small diameter V-belt pulleys and will be described with particular reference thereto; however, it will be appreciated the invention is capable of broader application and can be used for producing a variety of types and sizes of pulleys.

The typical V-belt, power transmission pulley currently in use is generally formed from an iron casting which is finish machined to the required tolerances. Although the pulleys are a very simple structure, because of the machining requirements, their cost is somewhat higher than would be expected. Additionally, the cost is further increased by the requirement that they be coated or plated to prevent corrosion.

It has been proposed to form the pulleys from plastic by injection molding techniques. This has not been successful because of the difficulty of holding the required tolerances. Further, the conventional molding techniques leave flashing about the pulleys along the mating line between the two die halves. Consequently, the pulleys must be machine to remove the flash and give them the proper final dimensions. Thus, substantially no savings has been realized by making the pulleys from plastic.

The present invention provides a composite plastic pulley construction and method of making the same which overcomes the above problems and provides substantial savings in manufacturing. Pulleys formed in accordance with the invention require no machining and can be made to extremely close tolerances. Additionally, the pulleys can be made without the usual mounting hub and can be provided with a simple snap-on-type mounting flange. All of these factors produce a pulley which is inexpensive to produce and which, because of its light weight and ease of installation, offers additional savings in shipping and installation cost.

In accordance with one aspect of the invention there is provided a pulley which comprises first and second body members each molded from plastic and each having a truncated conical section. At least one of the members has an axially aligned cylindrical section extending outwardly from its conical section. Also, each member has a shaft receiving opening extending axially therethrough and the end face of the cylindrical section is perpendicular to the opening. The two members are joined together with their openings aligned and their conical sections in opposed face-to-face relationship.

Preferably, and in accordance with a more limited aspect of the invention, the two members are identical in size and shape and each has one of the cylindrical sections. Additionally, means are provided for connecting the pulley to a shaft and in accordance with one embodiment of the invention these means include a metal flange member having a central shaft receiving opening and prongs which extend inwardly of the opening for resiliently engaging a shaft. The flange is welded to the pulley in alignment with the opening.

In accordance with another aspect of the invention, the truncated conical sections are stamped metal discs of identical size and configuration. The discs are each provided with a central, axial opening and a flange which extends parallel to the axis of the opening. The two discs are positioned on a cylindrical plastic sleeve with their smaller diameter ends in face-to-face relationship and their flanges joined to the outer surface of the sleeve. The internal diameter of the sleeve is sized for being received on a shaft and means are provided for connecting the sleeve to the shaft.

Accordingly, a primary object of the invention is the provision of a pulley construction that allows pulleys to be formed to close tolerances with substantially no machining required.

Another object is the provision of a plastic pulley construction and method of forming the same which produces pulleys which are both light in weight and inexpensive.

A further object of the invention is the provision of a V-belt-type pulley which can be formed from two identical, injection molded plastic parts.

Yet another object is the provision of a method of forming an injection molded plastic pulley wherein there are no problems with flashing.

A still further object is the provision of a pulley construction comprised of two, substantially identical, flange sections joined through a hollow, shaft receiving hub section formed from plastic.

Another object is the provision of a pulley of the type described wherein the flange sections are identical metal stampings bonded to a plastic hub section.

These and other objects and advantages will become apparent from the following description when read in conjunction with the accompanying drawings wherein.

Figure 1:
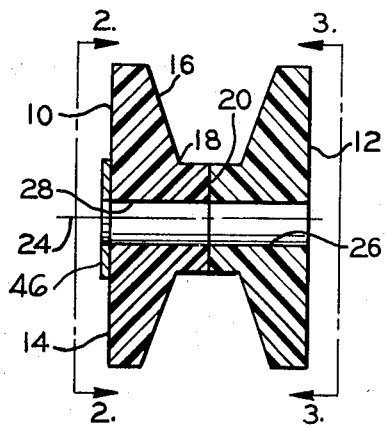
FIG. 1 is a cross-sectional view taken on a plane extending diametrically through a pulley formed in accordance with the preferred embodiment of the invention.
Figure 2:
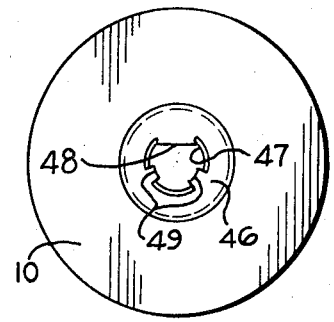
FIG. 2 is a end view taken on line 2—2 of FIG. 1.
Figure 3:
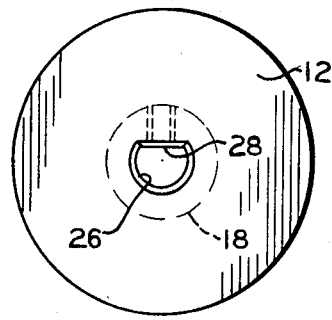
FIG. 3 is a view showing the opposite end of the pulley of FIG. 1 and taken on line 3—3 of FIG. 1.

Referring in particular to FIGS. 1–3; the preferred embodiment of a V-belt-type pulley formed in accordance with the invention is shown. The pulley shown comprises first and second body members 10 and 12. Each of the members 10 and 12 are, in the embodiment under consideration, of identical configuration; however, as will become apparent hereafter, these two members can be given different configurations within the scope of the invention. In particular each of the members 10 and 12 comprises a cylindrical portion 14 which is formed integrally with a truncated conical section 16. Integrally formed with the conical section 16 is a cylindrical central hub portion 18. The face 20 of the cylindrical hub portion 18 is preferably perpendicular to the central axis 24 of the member. Additionally, a bore 26 extends axially through the member and, as shown in FIGS. 2 and 3, is provided with an internal flat 28. The bore is arranged so as to receive a pulley mounting shaft with the flat 28 cooperating with a corresponding flat machined on the shaft to prevent relative rotation between the pulley and the shaft.

As previously mentioned, in the subject embodiment the members 10 and 12 are of identical size and configuration. Accordingly, when the two members joined with their faces 20 in engagement, the central hub portions 18 connect the flanged or truncated portions in the proper relationship for receiving a V-belt. As will become apparent hereafter, the central hub portion could be formed entirely on one or the other of members 10 and 12 or, alternately, formed as a member separate from each; however, it is much preferable that each of the members be provided with a hub portion of equal length. This permits one mold to be used for forming both members.

Figure 7:
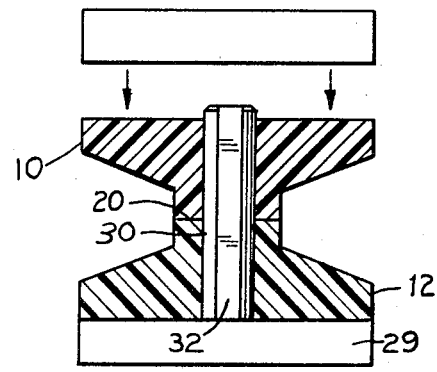
FIG. 7 is a view, somewhat diagrammatic, showing the manner in which the members of FIG. 5 are joined to form the pulley of FIG. 1.

The two members 10 and 12 can be joined along their faces 20 in a variety of ways. Preferably, and in accordance with one aspect of the invention, they are joined by an ultrasonic welding operation. The weld operation is depicted somewhat schematically in FIG. 7. As shown, one of the members is positioned on a base 29 which has an upwardly extending shaft 30 carried thereon. The shaft 30 is provided with a longitudinally extending flat 32 for engagement with the corresponding flat in the internal opening 26. The second one of the members is thereafter positioned adjacent the first with their surfaces 20 in engagement. Ultrasonic energy is then applied to the two members to produce an ultrasonic weld at the mating faces.

Figure 6:
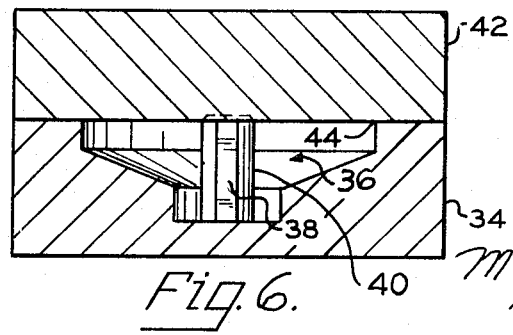
FIG. 6 is a cross section through dies adapted to form the member of FIG. 5.

FIG. 6 shows a mold arranged for molding the members 10 and 12. As will be noted, the mold includes a lower half 34 provided with an opening or cavity 36 which is machined to provide the desired configuration. The pin 40 extends axially through the opening and is provided with a machined flat 38. The upper die half 42 closes the cavity 36 and with the die halves firmly clamped together plastic is injected into the cavity by conventional injection molding techniques. Because of the arrangement of the die, any flashing which occurs will occur along the line 44 between the two die halves. As can be appreciated, this particular area is not a wear area for the pulley and does not interfere with the operation of the pulley or require additional machining steps.

Many types of plastic could be used for making the pulleys provided they have the necessary properties. One type which has been found to be particularly suitable is sold under the name of "Delrin."

The pulleys formed in accordance with the invention can be provided with the usual lateral hub such as is provided in the typical cast iron pulley; however, the pulleys are preferably provided with connecting means such as shown in FIGS. 1 and 2. In particular, as shown in FIG. 2, a flange 46 formed from a relatively thin and flexible metal such as spring steel is positioned on the pulley assembly in axially aligned position with the opening 26 by any convenient means such as for example a welding process adapted to join dissimilar materials or any suitable adhesive. The flange 46 is provided with a central opening 47 and an inwardly extending tab 48 which corresponds with the flat surface 28 of the bore 26. Additionally, the flange 46 is provided with a pair of inwardly extending tab or finger portions 49 which are adapted to engage the outer surface of an associated shaft with a resilient gripping force so that the pulley can be installed merely by sliding it on the shaft.

Figure 4:
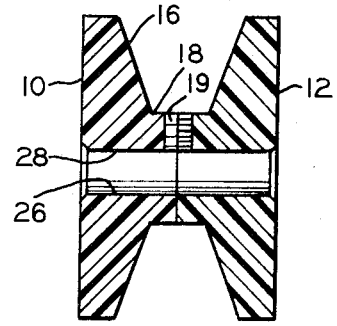
FIG. 4 is a cross-sectional view taken on a diametrical plane showing a modified form of the invention.
Figure 5:
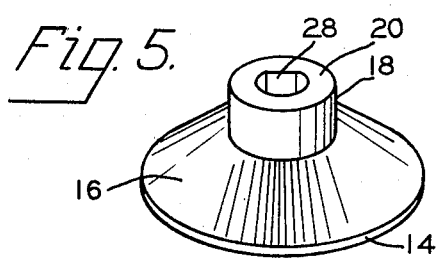
FIG. 5 is a pictorial view of one of the molded plastic members used for forming the pulley of FIG. 1.

FIG. 4 shows an alternate embodiment of the invention. In this embodiment the two halves are formed in the previously discussed manner; however, a threaded opening 19 is formed through the assembly at the bottom of the V-shaped groove and on the mating line between the two members. This opening permits a conventional setscrew to be used for mounting the pulley. The opening and threads can be formed during the injection molding operation or by drilling and tapping following the assembly operation.

Figure 8:
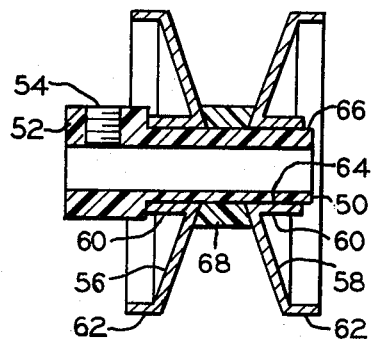
FIG. 8 is a cross-sectional view through a pulley formed in accordance with a second embodiment of the invention.
Figure 9:
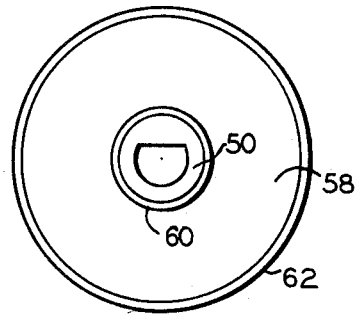
FIG. 9 is a right side view of the FIG. 8 embodiment.

Two additional modifications of the invention are shown in FIGS. 8-11. The pulleys shown in these modifications are both composite plastic and metal assemblies. Referring in particular to FIG. 8, the pulley shown therein comprises a central hub portion 50 which is formed from plastic and provided with a large diameter end portion 52 having a screw connecting opening 54 formed radially therethrough. Flange forming members 56 and 58 are dish-shaped metal stampings having an inner flange portion 60 and an outer flange portion 62. The center opening 64 extending through the member 56 is sized so as to be closely received on the reduced diameter portion 66 of member 50. Preferably, the member 58 is identical in size and configuration to the member 56.

Positioned between the members 56,58 and spacing them a desired distance apart is a collar member 68 which is merely a plastic ring having an internal diameter permitting it to be closely received on the reduced diameter portion 66 of member 50.

In assembling the pulley of FIG. 8 it is preferable to use an adhesive to join the parts. Although many types of adhesives could be used, one adhesive which is capable of properly joining metal and plastic parts is sold under the trade name of "ARONALPHA." Merely by coating internal surfaces of the flange members and sliding them on to the central hub portion a rigid connection is assured.

Figure 10:
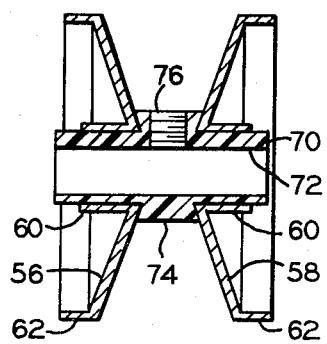
FIG. 10 is a cross-sectional view through a pulley formed in accordance with a third embodiment; and, FIG. 11 is a right side view of the pulley shown in FIG. 10.
Figure 11:
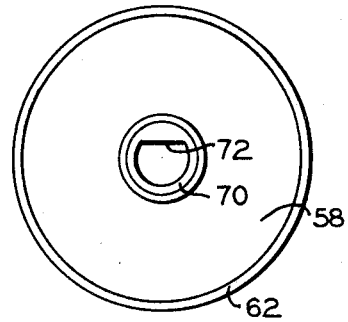

In the FIG. 10 embodiment the flange portions are identical to that shown in FIG. 8 and like reference numerals have been utilized to identify the corresponding parts. The primary difference between the FIG. 8 and FIG. 10 embodiments is in the arrangement of the internal plastic hub member 70. As will be noted, the hub member 70 is provided with a central opening having the necessary flat 72. At its midportion the hub 70 has an enlarged diameter or shoulder forming portion 74 which is provided with a setscrew opening 76. This embodiment can be assembled either by ultrasonic welding or by the use of the adhesives. As can readily be appreciated, neither the FIG. 8 nor the FIG. 10 embodiments require any machining since they are formed from simple stampings and/or injection molded plastic.

Pulleys formed in accordance with any of the described embodiments have the advantages of simplicity and light weight while being inexpensive to manufacture.

The invention has been described in great detail sufficient to anyone of ordinary skill in the art to make and use the same. Obviously, modifications and alterations of the preferred embodiment will occur to others upon the reading and understanding of the specification it is my intention to include all such modifications and alterations as part of my invention insofar as they come within the scope of the appended claims.

Having thus described my invention, I claim:

1. A V-belt-type pulley comprising first and second injection molded plastic body members each of which has a portion of truncated conical configuration, at least one of the body members having a cylindrical section extending outwardly from the small diameter end of its conical portion and a shaft receiving opening extending axially through both said conical portions and said cylindrical section; the outer end face of said cylindrical section being perpendicular to said opening and bonded to said first body member with said openings in alignment and said conical portions in opposed face-to-face relationship.

2. The pulley as defined in claim 1 wherein each of said body members are identical in size and configuration and each have a cylindrical section extending outwardly.

3. The pulley as defined in claim 1 including connecting means for attaching said pulley to a shaft.

4. The pulley as defined in claim 1 wherein said connecting means includes a setscrew receiving opening extending through said members perpendicular to said shaft receiving opening.

5. The pulley as defined in claim 1 wherein said connecting means comprises a resilient metal spring washer means bonded to one of said members adjacent said shaft receiving opening.

6. A pulley comprising first and second members of truncated conical configuration bonded to a central plastic sleeve with their small diameter ends in face-to-face relationship, said first and second members being stamped metal discs each having a flange engaged with said sleeve; and, means for connecting said sleeve to a shaft.

7. A pulley as defined in claim 6 wherein said central sleeve extends outwardly of said flanges and said connecting means comprises a setscrew receiving opening extending radially through said sleeve.

* * * * *